(12) United States Patent
Burge

(10) Patent No.: US 6,267,553 B1
(45) Date of Patent: Jul. 31, 2001

(54) GAS TURBINE COMPRESSOR SPOOL WITH STRUCTURAL AND THERMAL UPGRADES

(76) Inventor: Joseph C. Burge, 1 Rabbits Run, Palm Beach Gardens, FL (US) 33418

( * ) Notice: Subject to any disclaimer, the term of this patent is extended or adjusted under 35 U.S.C. 154(b) by 0 days.

(21) Appl. No.: 09/586,549

(22) Filed: May 31, 2000

Related U.S. Application Data

(60) Provisional application No. 60/137,149, filed on Jun. 1, 1999.

(51) Int. Cl.$^7$ ................................. F01D 5/08; F01D 5/14
(52) U.S. Cl. ....................... 415/115; 415/176; 415/174.4; 415/174.5; 416/95; 416/198 A
(58) Field of Search ..................................... 415/115, 116, 415/176, 177, 178, 173.7, 174.4, 174.5; 416/95, 198 A, 201 R

(56) References Cited

U.S. PATENT DOCUMENTS

| | | | |
|---|---|---|---|
| 4,645,416 | * 2/1987 | Weiner | 415/115 |
| 4,648,241 | 3/1987 | Putman et al. | 415/115 |
| 4,719,747 | * 1/1988 | Willkop et al. | 415/115 |
| 4,793,772 | 12/1988 | Zaehring et al. | 416/95 |
| 4,808,073 | 2/1989 | Zaehring et al. | 416/95 |
| 4,920,741 | 5/1990 | Liebl | 415/115 |
| 4,961,309 | 10/1990 | Liebl | 415/115 |
| 5,271,711 | * 12/1993 | McGreehan et al. | 415/115 |
| 5,297,386 | 3/1994 | Kevistin | 415/115 |
| 5,564,896 | 10/1996 | Beeck et al. | |
| 5,685,158 | 11/1997 | Lenahan et al. | 418/95 |
| 5,755,556 | 5/1998 | Hultgren et al. | |

* cited by examiner

Primary Examiner—Edward K. Look
Assistant Examiner—Richard Woo
(74) Attorney, Agent, or Firm—Dowrey & Associates

(57) ABSTRACT

An improved spool for a compressor of a gas turbine engine comprising spacer disks disposed between adjacent rotor disks, and a plurality of hollow tie rods that extend through the rotor disks and the spacer disks. The tie rods are tensionable to provide axial preload between the disks, and also conduct active air for thermally conditioning spool components. The spacer disks have an outer portion with a catenary shape that extends between the peripheral rims of the adjacent rotor disks. Sealing teeth located on the outer portion are preferably radially aligned with a web portion that extends radially inward from a center region on the outer portion. Each tie rod has at least one aperture through its wall for transmitting active air. In one embodiment, active air is injected through apertures in the forward stub shaft of the spool and is urged into at least one space between a rotor disk and a spacer disk, then into, along, and out of the hollow tie rods. In another embodiment active air is injected into open forward ends of the tie rods and subsequently dispersed through apertures in the tie rods. The last stage of the compressor includes a pair of mating forward and aft rotor disks with a cavity formed between the disks. A portion of the active air discharged from the tie rods is circulated in the cavity and into the hollow blades which are integral with the rotor disks. A compressor discharge pressure seal extends axially to the last stage aft rotor disk. The seal has teeth which are oriented generally axially, and preferably have a fishmouth configuration.

41 Claims, 11 Drawing Sheets

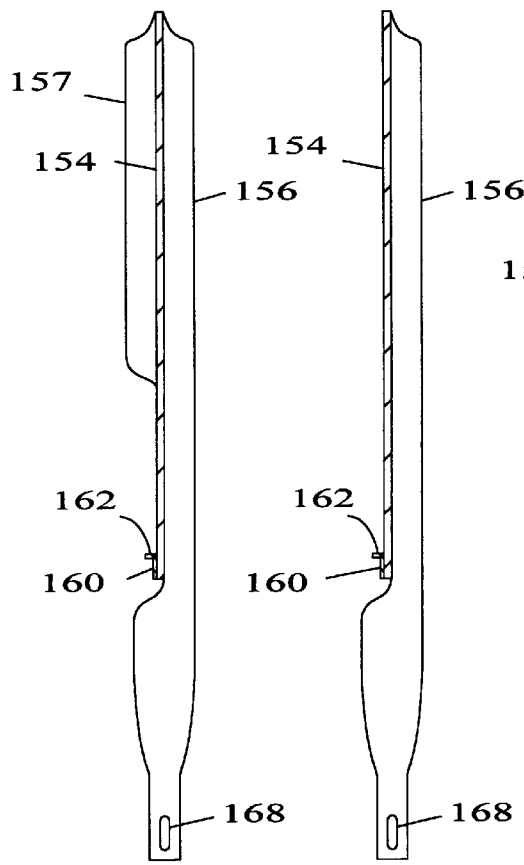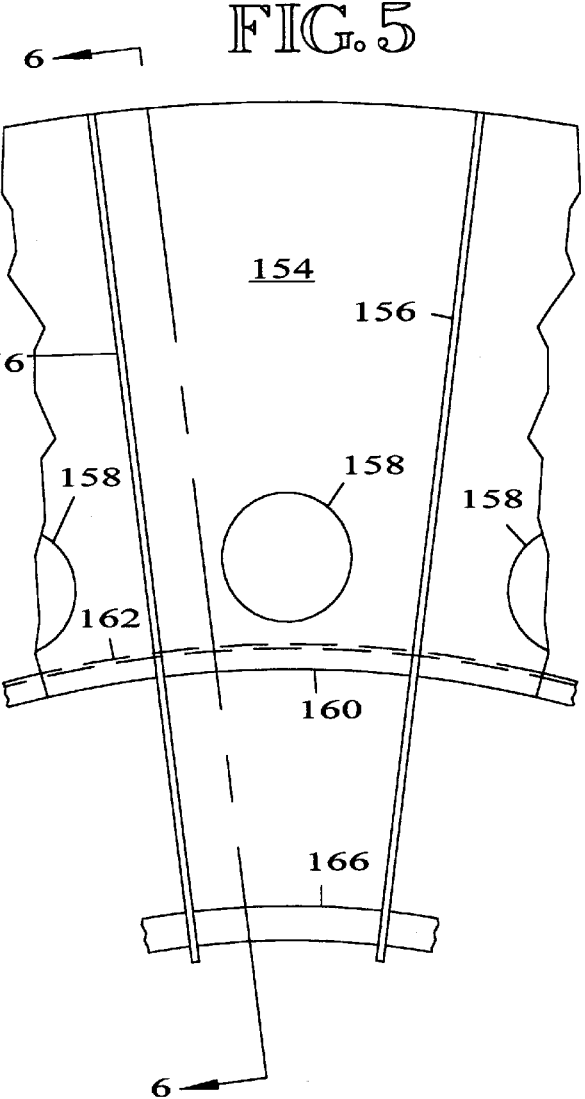

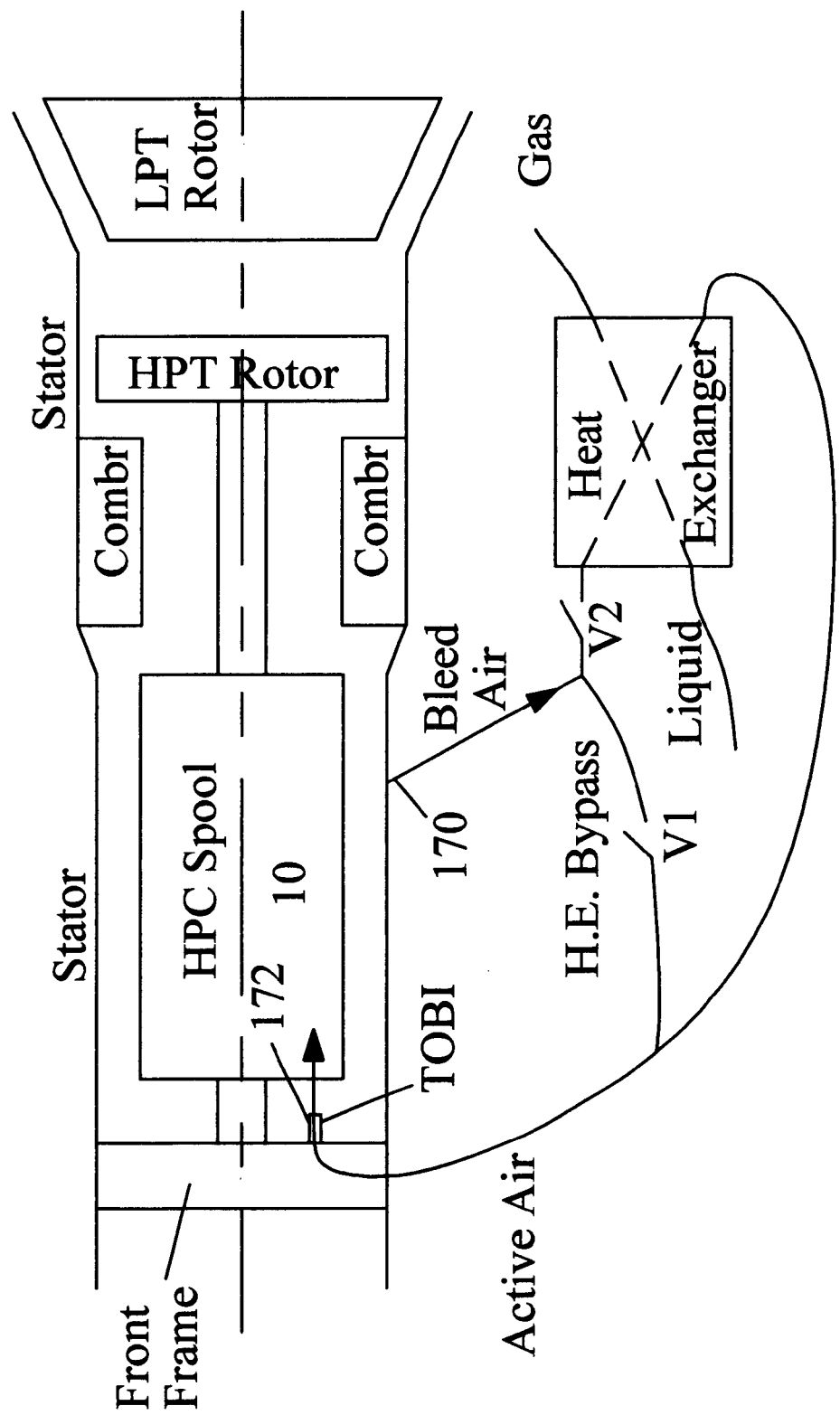

GAS TURBINE COMPRESSOR SPOOL WITH STRUCTURAL AND THERMAL UPGRADES

CROSS-REFERENCE TO RELATED APPLICATIONS, IF ANY

This application claims the benefit, under 35 U.S.C. 119(e), of U.S. provisional application Ser. No. 60/137,149, filed Jun. 1, 1999, pending.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention

The present invention relates, generally, to gas turbine engines. More particularly, the invention relates to compressors for gas turbine engines for aircraft. The invention has particular utility for improving the efficiency of the high-pressure compressor on aircraft gas turbine engines.

2. Description of the Prior Art

Though it does not depict any existing engine, FIG. 1 illustrates the current state-of-the-art for gas turbine high-pressure compressor spools 10 in aircraft engines, and is included to provide a frame of reference for the subsequent discussion of prior art and for the present invention.

Efforts are ongoing to reduce fuel burn per pound of thrust in gas turbine engines for aircraft. One way to achieve that is to increase the efficiency of the compressor. There are several approaches for achieving that: (1) increase the maximum surface speed of the spool; (2) improve the efficiency of each stage of the compressor; and (3) increase the compressor pressure ratio capability.

Material stress limits and stiffness of conventional spool structures do not allow for increasing the maximum surface speed without adding significant mass to the spool structures. Current spool speed limits are set by rapid radial excursions from idle to maximum power conditions at the spacer mid-span locations between adjacent disks. For example, those conditions would occur if a runway incursion forced an aircraft to take off again immediately after touching down. At those conditions, the stator is at near idle temperatures and the spool is near its maximum speed and temperatures, resulting in large radial deflections and life limiting low cycle fatigue (LCF) stresses at the mid-span of the disk spacers 12, 14, and 16, which typically is where the seal teeth, 18, 20 and 22 are located. The seal teeth exacerbate the LCF stress limit problem because of local concentration of stresses at the teeth, and because of hard abrasive coatings that are frequently used to coat the tips of the teeth.

To minimize the weight of the compressor spool structure, rotor disks 24, 26, 28, and 30 are integral with blades 32, 34, 36, and 38 respectively for compressors used in aircraft engines. Disks and spacers are designed to minimize the number of bolts 40, 42 required to assemble the spool 10. For example, disk 26 has spacers 12 and 14 integrally attached, such as by welding, and disk 30 has spacer 16 and rear stub shaft 44 integrally attached. Such a practice makes disks 26 and 30 with all their integral structure very complex and expensive to make, repair, or replace.

Rotor disks were not always bolted together as illustrated in FIG. 1. In the 1950s, the J93 engine made by General Electric used a tie rod arrangement to hold the disks together. At the time, the airfoils used in the high-pressure compressor (HPC) for the J93 had a much higher aspect ratio than those of contemporary HPC's, and the resulting limited axial space between disks dictated a tie rod arrangement with spool external access to the threaded tie rods at assembly. The J93 engine also used curvics at the tie rods to centralize the disks and to provide a spool axial preload and torque path. Curvics, with their mating teeth, are expensive and heavy and they interfere with flow of secondary air within the spool. As the aspect ratio of airfoils used in compressors has decreased, the spacing between disks has increased, thereby allowing access for bolts between disks, and the configuration illustrated in FIG. 1.

The efficiency of each stage of the compressor can be improved by minimizing the cavity volumes between the stator shrouds 46, 48, and 50, and the disk spacers 12, 14, and 16. Circumferential air circulations in these cavities have an adverse impact on the compressor efficiency and stall margins. But conventional conical or cylindrical shaped spacers 12, 14, and 16 are not conducive to minimizing volume between them and substantially horizontal radial seal surfaces at the bottom of the shrouds 46, 48, and 50. An additional hindrance to minimizing volume between the first stage stator shroud 46 and the spacer 12 is the desire that the first stage stator vanes 52 be selectively pivotable about their axis. Since the first stage spacer 12 has a steep incline, significant clearance must be left for pivoting the stator vanes 52.

Compressor efficiency can also be improved by increasing the effectiveness of the compressor discharge pressure (CDP) seal 54 to minimize leakage. However, in conventional designs using a radial seal as shown, sufficient clearance, and hence, leakage must be allowed to accommodate radial excursions due to thermal cycling between static and maximum load conditions. Because the CDP seal 54 is located on the rear stub shaft 44, and the rear stub shaft 44 is attached at the rim of the last stage disk 30, the rear stub shaft 44 must be cooled.

Improvements in compressor performance will result in higher operating temperatures of the compressor, particularly at the last stage. Materials currently available limit the compressor discharge temperature to approximately 1150° F., a value that has not increased by more than approximately 50° F. for the last forty years. Because of this limitation, airfoil and disk life limits are reduced, particularly on the last stage of the compressor, when compressor performance improvements have been implemented. The airfoil and disk life limits can be increased by cooling the rear stages.

Several prior patents show apparatus and methods to cool the rotors of a gas turbine engine. U.S. Pat. No. 5,685,158 to Lenahan et al. discloses a means for extracting a portion of air from the combustor casing in a land-based gas turbine, routing it through a heat exchanger to cool it, and delivering the cooled air back to the rear of the compressor spool. U.S. Pat No. 5,897,386 to Kervistin discloses a means for tapping a portion of the bypass air for use in cooling the outer portion of rotor disks of the compressor and the base of blades attached to them. U.S. Pat. No. 5,755,556 to Hultgren et al. discloses a system of ducts in the rotors through which cooling air is directed. That system is designed for rotor disks with separately attached blades, as is the Kervistin system. U.S. Pat. No. 3,647,313 to Koff discloses a system for ducting air from the first compressor stage to the downstream end of the spool and back into the compressor inlet, with the air convectively circulating between rotor disks during its travel. This approach cools the aft disk bore portions and decreases their transient thermal response times. U.S. Pat. No. 4,793,772 to Zaehring and U.S. Pat. Nos. 4,920,741 and 4,961,309, both to Liebi, disclose circulating cooling air in a chamber formed outside of the stub shaft to cool the last compressor section. U.S. Pat. No. 4,808,073 to Zaehring et al. discloses vane-like ribs on the inside of the rear stub shaft which direct cooling air from the center shaft outwardly along the stub shaft and against the outer portion of the last rotor disk.

Another approach to disk transient thermal time reduction and cooling is disclosed in U.S. Pat. No. 4,648,181 to Putnam et al. Air is selectively bled from two different stages of the compressor, one warmer one cooler, and directed to the bore of the spool to actively control the rate of heating or cooling of the rotor, and thereby actively control and minimize the clearance of radial seals between the rotating and stationary portions of the compressor.

All of these active air methods require a source of air that has a high enough pressure to flow properly through the system, and a low enough temperature to provide the desired thermal effects. In aircraft engines, air taken from the bypass stream is very cool since it is not highly compressed, but its pressure may be insufficient to ensure proper flow direction, especially at low-power settings. Air taken from a high compression stage of the compressor has sufficient pressure, but may be too hot to provide effective thermal conditioning.

Recent advances in heat exchanger technology for aircraft gas turbine engines, specifically the use of phase change heat exchangers, have reduced the size of heat exchangers to practical sizes that allow high-pressure air from a high compression stage of the compressor to be sufficiently cooled to be effective in thermally conditioning the compressor spool components. The present invention makes use of such a source of thermal conditioning air and provides an improved high-pressure compressor spool which overcomes the limitations and shortcomings of the prior art.

SUMMARY OF THE INVENTION

The present invention provides structural improvements for a spool of a compressor on a gas turbine which allow increased surface speed of the rotors and improved efficiency to reduce fuel burn per pound of trust. A spacer disk with an outer portion and a web portion is disposed between adjacent rotor disks. The outer portion has a catenary shape that extends between the peripheral rims of the adjacent rotor disks. The peripheral rim of each rotor disk preferably has a lip which receives an end of the outer portion of the spacer disk. The web portion extends radially inward from a center region on the outer portion. Sealing teeth are located on the outer portion, and preferably are radially aligned with the web portion. The catenary shape is conducive to reducing radial strain and bending stress of the outer spacer portions. Strains in the sealing to teeth are, therefore, also reduced. The reduced radial deflection of the catenary shaped spacer outer portions and sealing teeth allow the maximum surface speed of the compressor spool to be increased, thereby increasing the output pressure capability of the compressor.

The spool is held together by a plurality of hollow tie rods extending through the rotor disks and the spacer disks. The tie rods are tensionable to provide axial preload between the disks. The hollow tie rods also conduct active air used for thermally conditioning spool components. Each tie rod has at least one aperture which receives active air and at least one aperture which discharges active air. At least one of the discharge apertures discharges into the cavity between the forward and aft last stage rotor disks.

Each tie rod has a plurality of tubular elements on it, with each tubular element being disposed between adjacent spacer and rotor disks. Tubular elements corresponding with the locations of the apertures and tie rod have apertures in them which align with the apertures in the tie rod. An alignment feature, such as a threaded pin, keeps the apertures in the tubular elements aligned with those in the tie rod.

The last stage of the compressor includes a pair of mating forward and aft rotor disks with a cavity formed between the disks. In the cavity is a baffle plate which generally bisects the cavity into a forward portion and an aft portion. The baffle plate has radial vanes on its aft side. The blades on the last stage include mating forward and aft portions, the forward portion being integral with the forward rotor disk and the aft portion being integral with the aft rotor disk. The blades have an internal cavity in fluid communication with the cavity between the forward and aft rotor disks.

A compressor discharge pressure seal extends axially to the last stage aft rotor disk. The seal teeth are oriented generally axially, and preferably have a fishmouth configuration.

A portion of the main air stream is extracted from the stator at a stage before the last stage and at least a portion of it is selectively routed through a heat exchanger or a bypass of the heat exchanger. At least part of the extracted portion of air from the heat exchanger or from the bypass is injected through apertures in the front stub shaft as active air for use in thermal conditioning spool components. A portion of the active air is urged into at least one space between a rotor disk and a spacer disk, then into at least one aperture in the tie rods, through the interior of the tie rods, and out through at least one aperture in the tie rods. Active air which flows out from one of the tie rod apertures into the cavity between the last stage rotor disks flows outward between the forward rotor disk and the baffle plate, into the last stage blades where it is circulated therein, then inward between the aft rotor disk and the baffle plate where flow is helped by the radial vanes.

The features, benefits and objects of this invention will become clear to those skilled in the art by reference to the following description, claims and drawings.

BRIEF DESCRIPTION OF THE DRAWINGS

FIG. 5 is an end view of a portion of the baffle plate and radial vanes located between fourth stage rotor disks.

FIG. 6 is an elevational view taken along line 6—6 in FIG. 5.

FIG. 7 is a schematic illustration of an aircraft gas turbine engine compressor active air system illustrative of the active air flow paths outside of the high-pressure compressor.

DETAILED DESCRIPTION OF THE PREFERRED EMBODIMENTS

Figure 2:
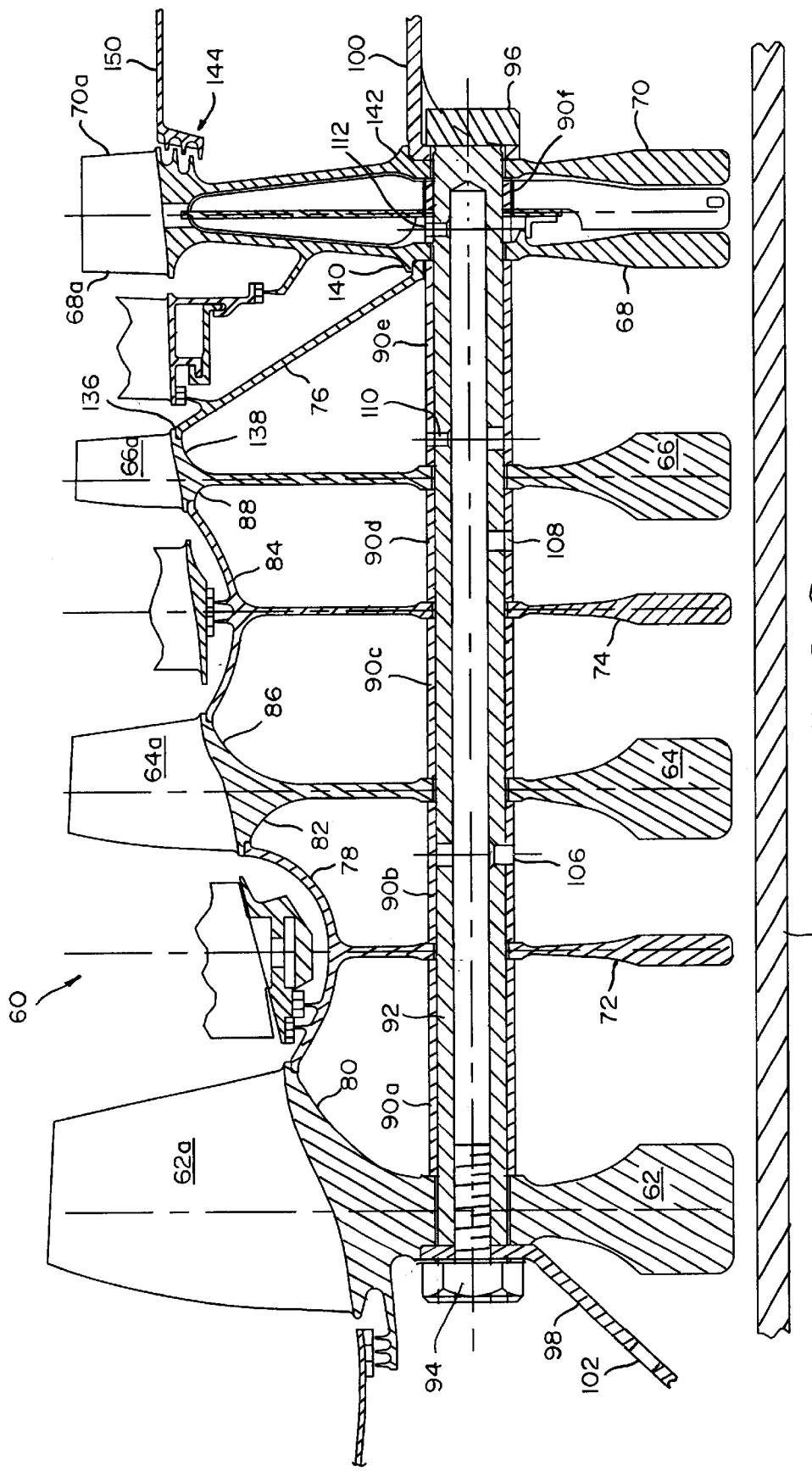
FIG. 2 is a partial, longitudinal cross-sectional view of one embodiment of an improved high-pressure compressor for an aircraft gas turbine engine.

Referring to FIG. 2, an example of the preferred embodiment of the present invention is illustrated and generally indicated by the reference numeral 60. The compressor spool 60 is described below first in terms of its major structural elements and then in terms of its secondary structural and/or functional elements which cooperate to improve the performance of the rotor.

The compressor spool 60 has a plurality of rotor disks 62, 64, 66, 68 and 70 with heir integral blades 62a, 64a, 66a, 68a and 70a respectively. Rotor disks 68 and 70 and blades 68a and 70a respectively mate together as front and rear halves to form the fourth and last stage compressor rotor. A spacer disk 72 is located between rotor disks 62 and 64, and a spacer disk 74 is located between rotor disks 64 and 66. A conical spacer drum 76 is located between rotor disks 66 and 68. Spacer disk 72 has an outer spacer portion 78 which spans the opening between rims 80 and 82 of rotor disks 62 and 64 respectively. Outer spacer portion 78 has a catenary shape with approximately equal portions extending from either side of disk 72. The web portion of disk 72 extends radially inward from a center region on the outer spacer portion 78. Similarly, spacer disk 74 has an outer spacer portion 84 with a catenary shape spanning the opening between rims 86 and 88 of rotor disks 64 and 66 respectively. Rotor disks and spacer disks are held together by hollow tie rods 92. Tubular elements 90a–f are placed between adjacent rotor and spacer disks to act as compression spacers to provide an axial pre-load path and to establish the axial spacing between disks. Tubular elements 90a–f are aligned so that hollow tie rod 92 passes through apertures in the disks and inside of tubular elements 90a–f. There are a plurality of these tube-and-tie-rod configurations circumferentially around the spool 60, preferably all at the same radius. The preferred number of tie rods is twenty-four since that number minimizes the stress concentration factor of the disk web tie rod apertures, but the number can be more or less depending upon other design requirements. End bolts 94 on tie rods 92 hold the rotor assembly together. Tie rod 92 preferably has internal threads at one end which engage threaded bolt 94. End 96 of tie rod 92, opposite of bolt 94, is an integral aft end of the tie rod and preferably has a tombstone head to react the bolt 94 assembly torque. The tombstone head also provides an indexing feature on tie rods so that apertures in the tie rods point in the desired direction during assembly and remain so when the tie rod bolt 94 is torqued. Tie rods 92 also connect a forward stub shaft 98 to rotor disk 62 and a rear stub shaft 100 to rotor disk 70. The stub shafts 98 and 100 connect to bearings for the rotor in a conventional fashion.

Forward stub shaft 98 has a plurality of apertures 102, preferably circular, oriented circumferentially around stub shaft 98 through which cooling air is introduced. The forward stub shaft 98 is preferably made locally thicker in the vicinity of apertures 102. The number of apertures preferably corresponds with the number of tie rods 92 which, in this embodiment, is twenty-four. The active air flows rearward along the annulus between the low-pressure (LP) shaft 104, which passes through the bore of the spool 60, and the rotor and spacer disks. Apertures 106 and 108 in tie rod 92 and in tubular elements 90b and 90d forward of rotor disks 64 and 66 respectively facilitate airflow along the front of rotor disks 64 and 66 and into hollow tie rod 92. Aperture 110 in tie rod 92 and in tubular element 90e aft of rotor disk 66 provides one exit for active air in hollow tie rod 92 which then flows outward along the rear side of rotor disk 66 then inward along spacer drum 76 and the inner forward side of rotor disk 68. Aperture 112 in tie rod 92 and in tubular element 90f provides another exit for active air which flows radially outward between rotor disks 68 and 70 and is circulated inside hollow fourth stage rotor blades formed by the joining of blades 68a and 70a.

Catenary Spacer Disks

Figure 3:
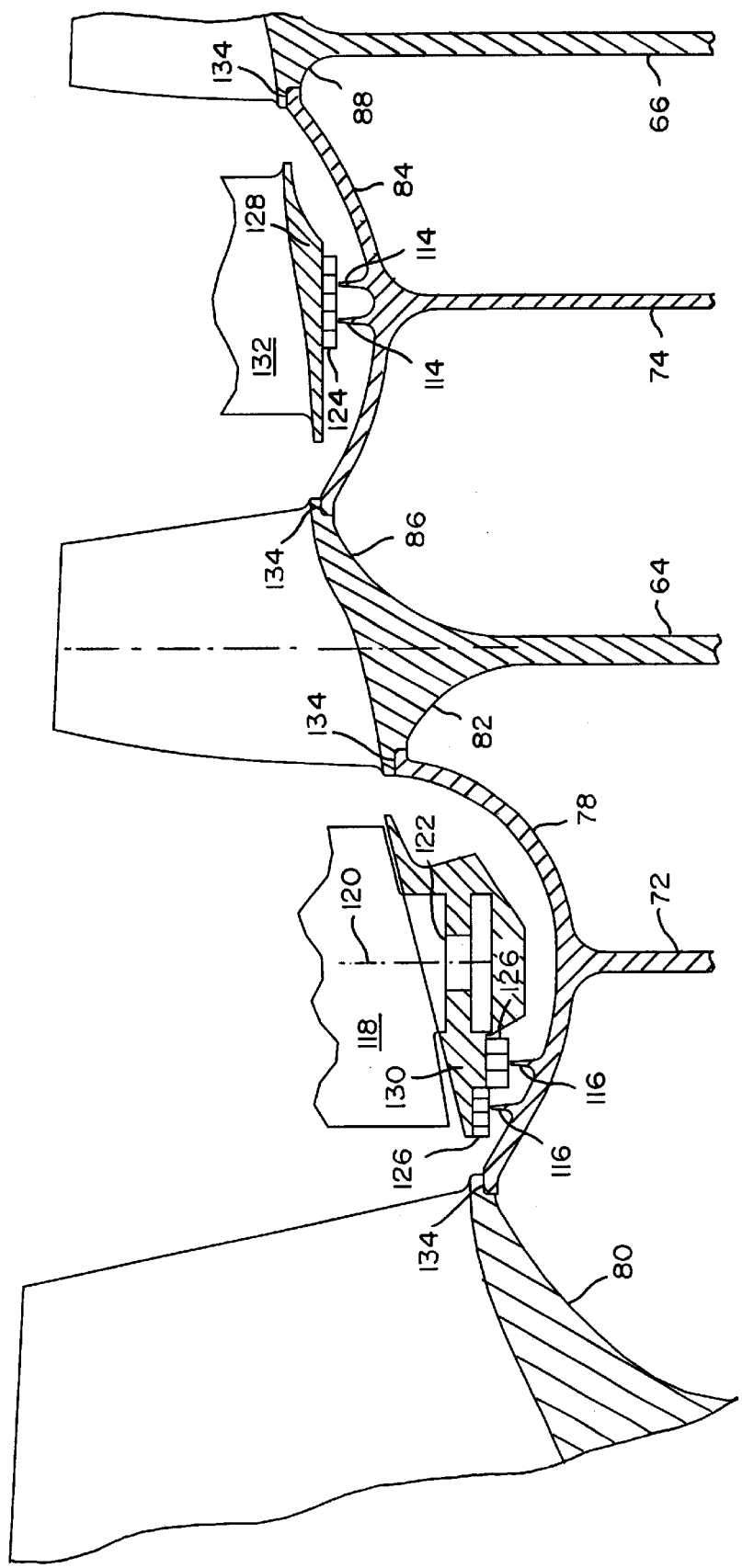
FIG. 3 is an enlarged view of a portion of FIG. 2 showing the interface between catenary shaped outer portions of spacer disks and stator vanes.

Referring to FIGS. 2 and 3, the use of spacer disks 72 and 74 with catenary shaped outer spacer portions 78 and 84 in combination with the lower radius tie rods 92 and bolts 94 allow the compressor spool 60 to rotate at a higher maximum speed than the current art. Spacer disks 72 and 74 provide radial support for outer spacer portions 78 and 84 respectively. The axial span between radial support disks is thereby reduced. With conventional bolt-up designs, spacers span the entire distance between rims 80 and 82 and between rims 86 and 88 without radial support. Radial excursions from cold static to maximum power conditions at the spacer mid-span locations typically limit the maximum surface speed of the rotor. The unsupported axial span in the present invention is only the distance between a spacer disk and the rim of the associated rotor disk, which is about half that of the distance between rotor disk rims in the current art.

The outer spacer portions 78 and 84 of spacer disks 72 and 74 respectively have a catenary shape in cross-section rather than a conventional cylindrical shape. This shape is conducive to reducing radial strain of the outer spacer portions 78 and 84, as well as reducing bending stress in them for a given radial load.

On spacer disk 74, radial seal teeth 114 are preferably located in alignment and parallel with disk 74 to take advantage of the radial stiffness of disk 74. This minimizes the radial movement of teeth 114, and thereby minimizes the risk of cracking the tips of teeth 114, or fracturing an abrasive coating which may be applied to teeth 114.

On spacer disk 72, seal teeth 116 would ideally be located in line with disk 72 as well; however, the forward stator vanes 118 must pivot about radial axis 120 to flow match the compressor at idle conditions. The position of the structure 122, required to allow the vanes 118 to pivot, necessitates moving the seal teeth forward from disk 72. Because of the reduced axial span between rims 80 and disk 72, and the advantages of the catenary shape of spacer portion 78, the radial deflections of seal teeth 116 are still substantially less than those of conventional rotor designs. Seal teeth 14 and 116 interface in well-known manner with seal material 124 and 126, such as honeycomb, respectively attached to shrouds 128 and 130 at the ends of stator vanes 132 and 1 18 respectively to form labyrinth seals.

The reduced radial deflection of the catenary shaped spacer outer portions 78 and 84 and sealing teeth 114 and 116 allow the maximum surface speed of the compressor spool 60 to be increased, thereby increasing the output pressure capability of the compressor.

Increased surface speed increases the radial load on rotating components. Radial load from rotation of spacer outer portions 78 and 84 is reacted at lips 134 in rims 80, 82, 86, and 88 of rotor disks 62, 64 and 66 as well as through disks 72 and 74. Radial load from rotation of spacer drum 76 is reacted at lip 136 in rim 138 of rotor disk 66 and at lip 140 in rotor disk 68. Lip 142 on rotor disk 70 also reacts radial load from rotation of rear stub shaft 100.

Torque loads may be adequately transmitted between rotors and spacers by the frictional forces due to high "G" loads at the interfaces of the disk rims with the spacer edges at lips 134, 136, and 140. Optionally, local radial lugs (not shown) may be used at those interfaces to carry the torque load and to ensure that no clocking occurs between the mating components. However, such lugs add stress concentrations as well as weight and cost.

Figure 13:
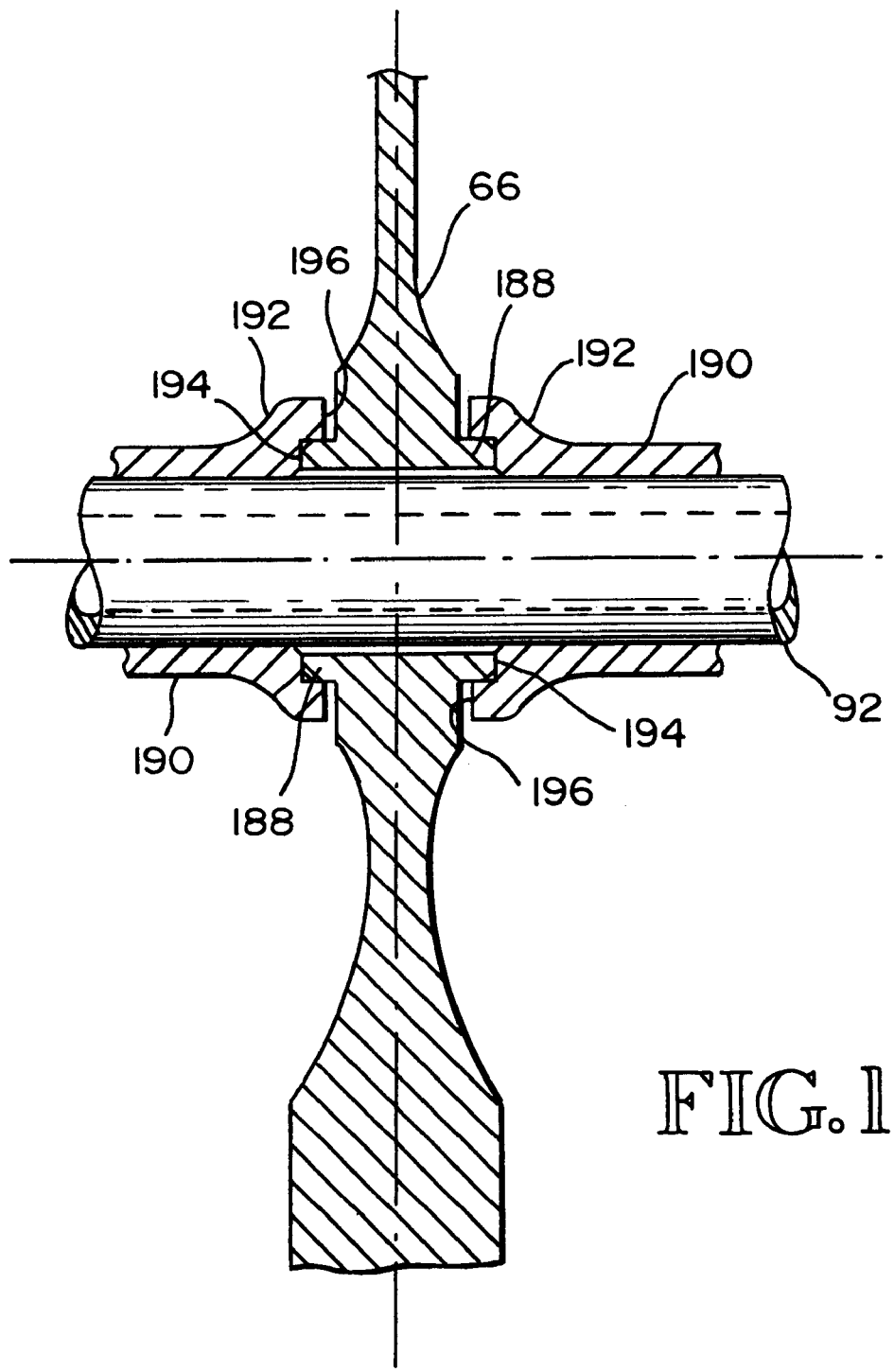
FIG. 13 is a partial cross section view of a portion of a rotor disk and tubular elements with a portion of the tie rod illustrating the interface between the tubular elements and the rotor disk.

The preferred means of transmitting torque loads between rotors and spacers is illustrated in FIG. 13. All rotor and spacer disks (represented by disk number 66) have circular embossments 188 around the apertures which receive tie rods 92. These embossments are external to the disk web stresses. Tubular elements 190 have flanges 192 at both ends with circular recesses 194 which receive embossments 188. Tubular elements 190 extend between adjacent disks as tubular elements 90 do. Axial compression load is transmitted through embossments 188 where embossments 188 contact recesses 194. Ends 196 of flanges 192 do not contact the local high stress regions in the disks adjacent embossments 188. The engagement of embossments 188 with the recesses 194 of tubular elements 190 provide for torque transmittal between the disks through tubular elements 190.

Radial support from the outer portions 78 and 84 of the spacer disks at the rims 80, 82, 86, and 88 of the rotor disks 62, 64, and 66 allows the rims to be made thinner. This, in turn, reduces the torsional rigidity of the rims and increases the blade tip front and aft end rub compliance. Responses of the rims to blade vibrations are also dampened due to the connection between rims and the outer portions of the spacer disks.

Figure 1:
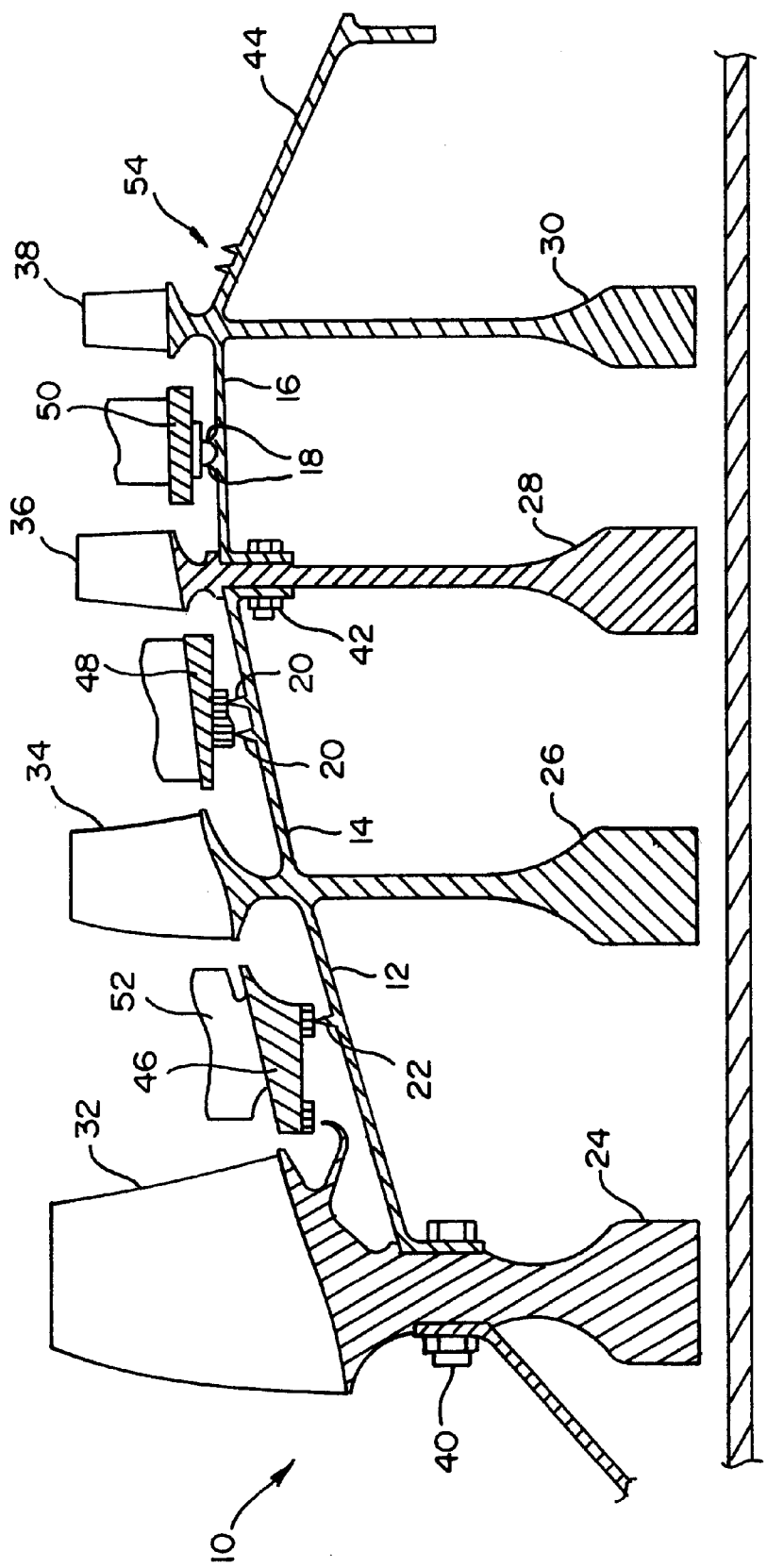
FIG. 1 is a partial, longitudinal cross-sectional view of a high-pressure compressor for an aircraft gas turbine engine illustrative of the prior art.

Circumferential air circulations in cavities between stator shrouds and disk spacers have an adverse impact on compressor efficiency and stall margins. Minimizing that cavity volume minimizes the air circulation. The catenary shape of outer portions 78 and 84 is conducive for minimizing the cavity volume between those portions and the stator shrouds 130 and 128. Ends of the outer portions are located at the rims of adjacent rotor disks. This is substantially radially outward of the location of the ends of the prior art spacer portions 18 and 20 illustrated in FIG. 1. Shrouds 130 and 128 attached to the ends of stator vanes 118 and 132 are shaped to generally mate with the catenary shape of portions 78 and 84. the cavity volume available for air circulation between outer portions 78 and 84 and shrouds 130 and 128 respectively is thereby minimized.

Hollow Tie Rods

Increased rotational speed also necessitates reducing the radius of bolted connections from that of conventional disk rim axial bolts to keep "G" loads within structural limits. Hollow tie rods 92 with end bolts 94 are at a substantially lower radius than conventional axial rim bolts. At their reduced radius on the disks, the tie-rod-to-disk interface loads are lower than with axial rim bolts. With lower mass, the hollow tie rods 92 deflect radially less than would solid tie rods. The tie rods also provide the primary axial load path between the disks. The tie rod length provides the required strain range to maintain preload requirements. Tubular elements 90*a–f* act as compression spacers to provide an axial pre-load path and to establish the axial spacing between disks. Outer portions 78, 84 of spacer disks 72, 74 are also axially loaded by the tie rod pre-load, but the maximum axial pre-loads on these portions are limited to known amounts by their catenary shapes.

Figure 8:
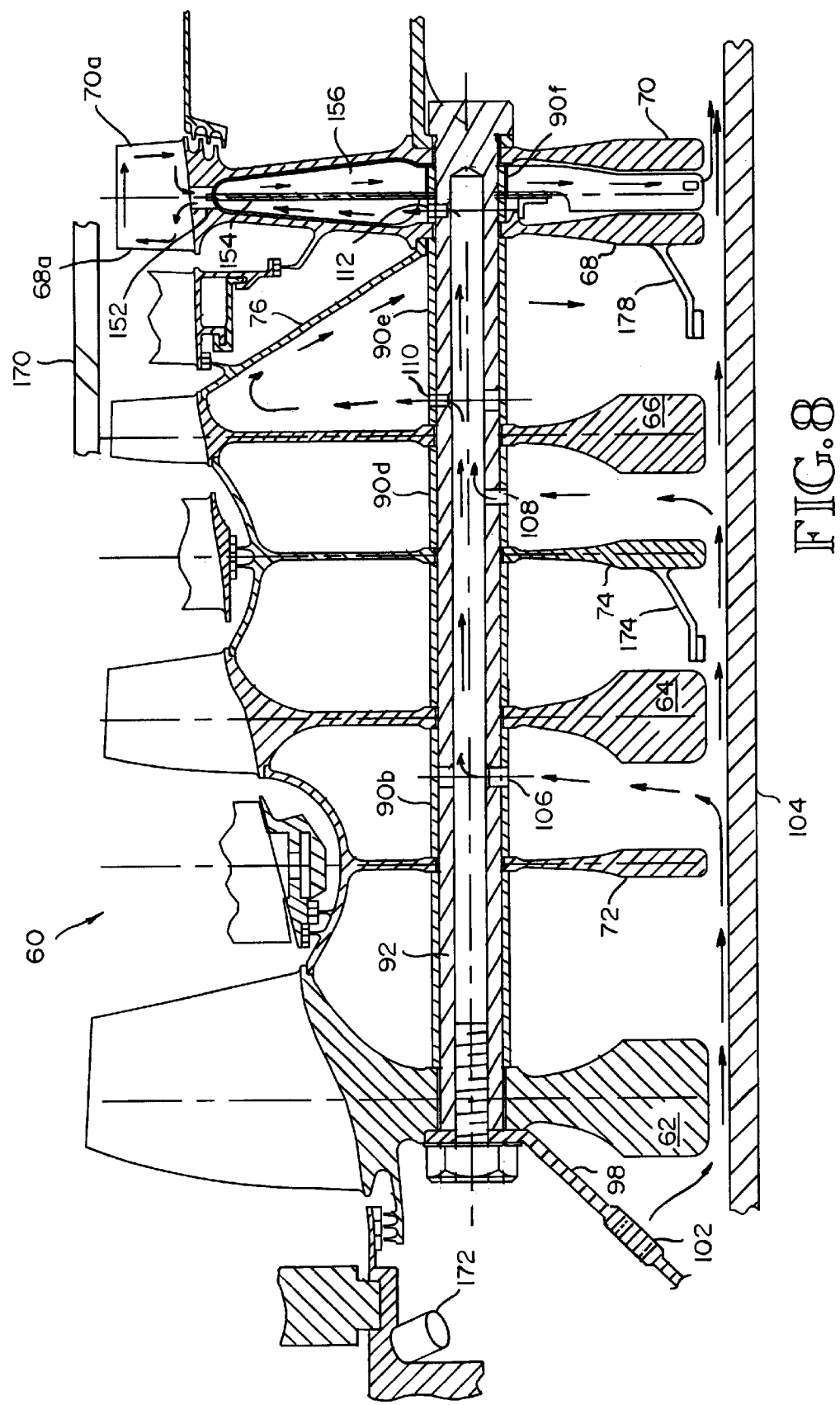
FIG. 8 is the view similar to FIG. 2 showing the active air flow paths among compressor spool components.
Figure 10:
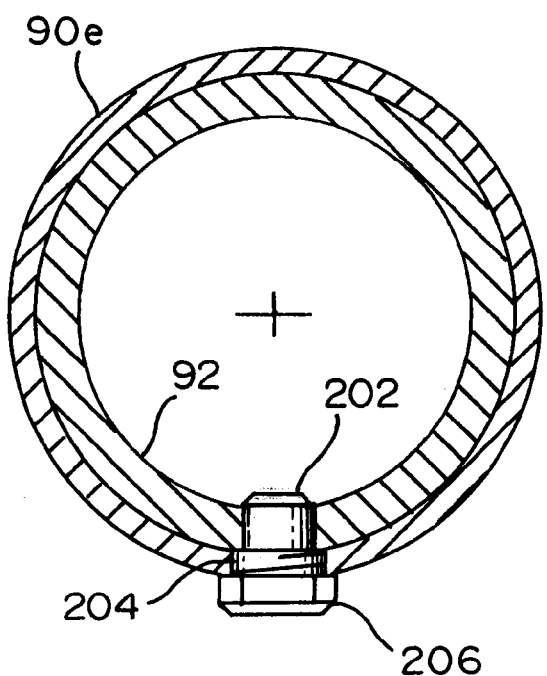
FIG. 10 is an elevational view taken along line 10—10 in FIG. 9.
Figure 9:
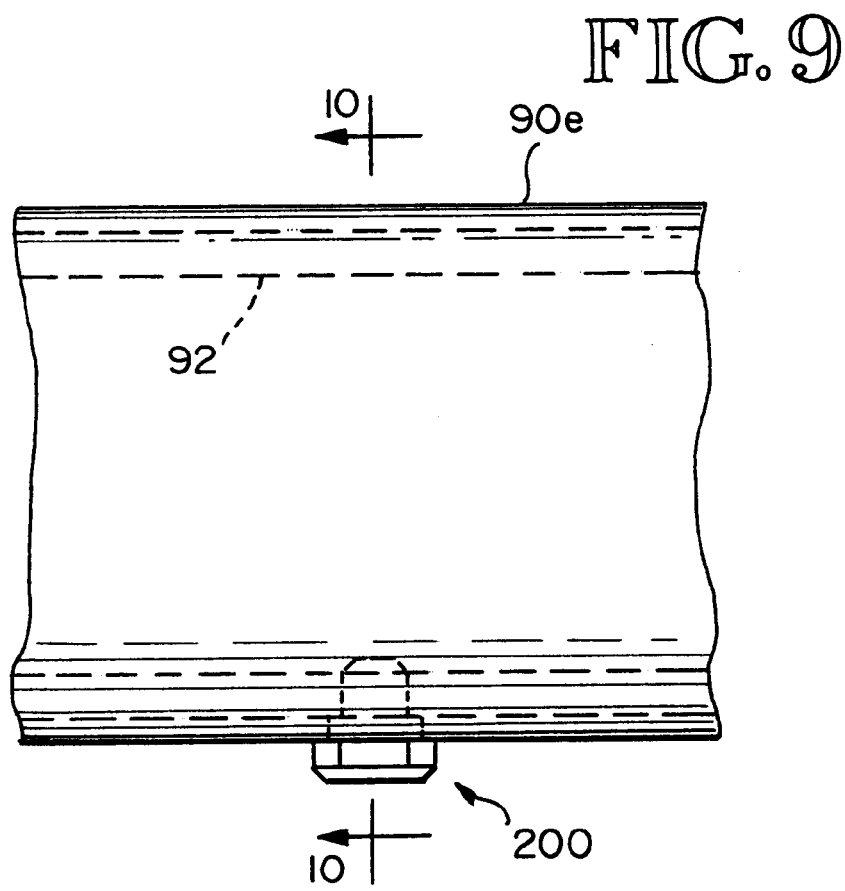
FIG. 9 is a cross-sectional view of a portion of a tie rod and a tubular element showing a feature for aligning the tubular element with the tie rod.

The hollow tie rods 92 also conduct active air used for thermally conditioning spool components. As shown in FIG. 8, active air flows into tie rod 92 through apertures 106 and 108, and flows out through apertures 110 and 112. Tubular elements 90*b*, 90*d*, 90*e*, and 90*f* have apertures in them which align with the apertures 106, 108, 110, and 112 in tie rod 92. Alignment features between tie rod 92 and tubular elements 90*b*, 90*d*, 90*e*, and 90*f* align the apertures in those tubular elements with their corresponding apertures in tie rod 92, and maintain their alignment during assembly and operation of compressor spool 60. Although several methods of mechanically aligning circumferential members are well known in the art, one example is illustrated in FIGS. 9 and 10 for tubular element 90*e*. A self-locking threaded indexing pin 200 has a pin portion of, a threaded portion 204 and a head portion 206. Pin portion 202 extends into an aperture in the wall of hollow tie rod 92 when threaded portion 204 threadably engages tubular element 90*e*. Head portion 206 is used to turn pin 200 to engage threaded portion 204 in tubular element 90*e*. Pins 200 are preferably located so that they face the bore of the compressor so that centrifugal force from rotation will tend to keep them in place.

Dual Fourth Stage Rotor Disks

Figure 4:
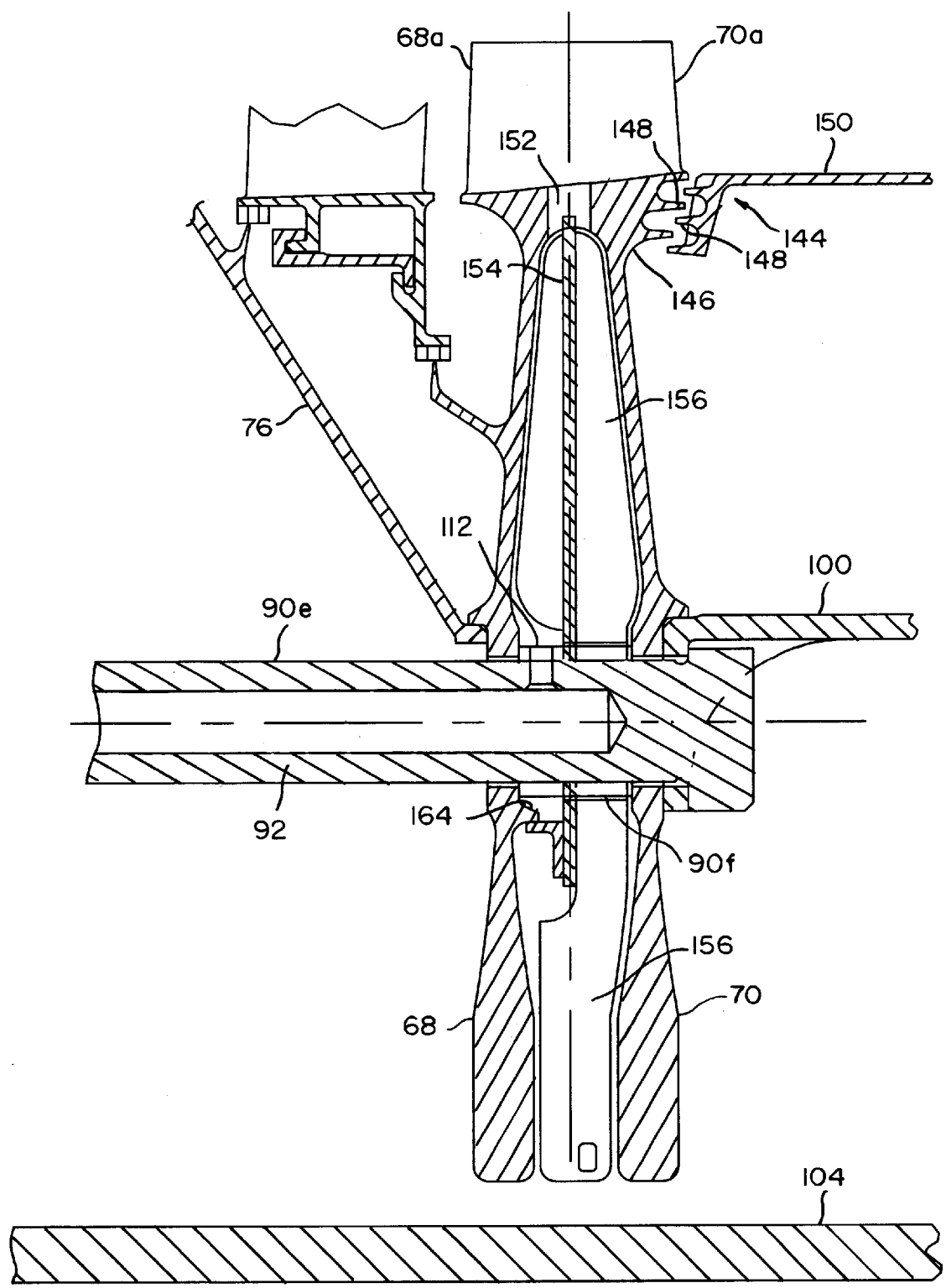
FIG. 4 is an enlarged view of a portion of FIG. 2 showing the fourth stage rotor disks.

Referring to FIGS. 2 and 4, rotor disks 68 and 70 and blades 68*a* and 70*a* mate together as front and rear halves to form the fourth and final stage compressor rotor. Separating the fourth stage rotor into two mating halves increases the fourth stage disk radial load carrying capacity, thereby allowing increased rotational speed, by (1) providing dual webs, (2) reducing the bore axial stress variations, and (3) increasing the disk bore forged properties. The disks are machined as a matched assembly with dowel-fit rim locator pins (not shown) to maintain alignment between them and to transmit torque between them. The division line is through the airfoil maximum thickness position. This provides access to the interior of the blade front and rear halves at the near-maximum-thickness airfoil mid chord location. The blade halves are hollow to reduce weight and to provide access for routing internal cooling air. An insert (not shown) inside each blade routes the cooling air through the blade in a manner known in the art and seals the gaps between the front and rear halves of the blade. The inserts also provide blade vibration damping.

As compressor output pressure is increased due to increased surface speed and/or improved efficiency, the discharge temperature increases as well. The highest temperature generated by a compressor occurs at the last stage rotor blades. The maximum temperature limit for materials currently available for rotor components is approximately 1150° F. The increased performance of this compressor requires cooling of the fourth stage rotor blades by approximately 150° F. to 200° F. to provide structural margins.

The increased axial stiffness due to the dual rotor disk configuration facilitates thermal isolation of the fourth stage rotor disk rims and blades to minimize conductive heat transfer to other portions of the spool 60. It also allows the radius at which the rear stub shaft 100 connects to the last stage to be reduced from that of prior art. To maximize spool stiffness, a rear stub shaft on prior art spools attaches at the rim of the last stage rotor and conically tapers inward. The increased stiffness of the dual rotor disk configuration allows the conically tapered drum 76 to connect at the rim of the third stage rotor and taper inward to a connection with fourth stage rotor disk 68 at the radius of the tie rods 92. Stub shaft 100 is cylindrical and connects to fourth stage rotor disk 70 at the radius of tie rod 92, which is substantially inward of the radius near the rims of the rotor where a stub shaft conventionally attaches.

Thermal isolation of the fourth stage disk rims is further improved by the use of an axial fishmouth type compressor discharge pressure (CDP) seal 144 made possible by the increased axial stiffness of the fourth stage rotor. Conventional CDP seals are radial, which have an inherent risk of seal thermal instability which can occur when seal tooth generated frictional heat results in progressively heavier seal tooth rubs.

CDP seal 144 has a fishmouth configuration which is well known in the art, and is arranged generally axially at the rim 146 of rotor 70. The portion 150 of seal 144 attached to the stator extends from the inner ring of the combustor section. The effectiveness of the CDP seal 144 is increased over conventional CDP seals by reducing the seal operating clearances. With an axial fishmouth type seal there is a greater capability to optimize clearances by changing rotor and stator axial spring constants. Furthermore, the danger of radial thermal instability at the seal teeth 148 is avoided. Seal teeth 148 are staggered axially and radially so that as, due to rotor heating, rim 146 of rotor 70 expands radially more than portion 150 attached to the stator, seal teeth 148 do not contact each other to create friction. The reduced clearances of the CDP seal 144 contribute to reducing the maximum temperature of rear stub shaft 100 by minimizing leakage of hot high-pressure compressor discharge air across seal teeth 148. Stub shaft 100 is also substantially distant from CDP seal 144 which further reduces the heating effect on it from leakage across the seal. The reduced clearances of the CDP seal 144 also provide additional engine axial thrust balance capability.

The increased axial stiffness due to the dual rotor disk configuration also facilitates the use of active cooling air to sufficiently cool the rims and blades. Space between rotor disks 68 and 70 is used to direct cooling air to and from blades 68a and 70a through aperture 152. Baffle plate 154 divides the space between rotor disks 68 and 70 outboard of tubular element 90f. Radial vanes 156 on the aft side of baffle plate 154 help move air inward from blade 70. Referring also to FIGS. 5 and 6, baffle plate 154 has apertures 158 which receive tubular elements 90f and tie rods 92. Preferably, there is an aperture 158 between any two adjacent vanes 156. Piloting member 160 is attached near the inner edge of baffle plate 154 and has piloting surface 162 at its outer edge. Piloting surface 162 mates with a lip 164 on rotor 68 to provide radial support and centering for baffle plate 154. Vanes 156 extend radially outward from tubular element 90f nearly to the outward end of the space between disks 68 and 70, and radially inward from tubular element 90f to the inner radius of disks 68 and 70. Inward of piloting member 160, vanes 156 become wider to nearly fill the space between rotors 68 and 70. Vane inner end support member 166 passes through aperture 168 in vanes 156 to connect and support inner ends of vanes 156.

Referring to FIG. 6a, baffle plate 154 may optionally have radial vanes 157 on its forward side to help move air outward from the tie rods to the blades. Vanes 157 extend radially outward from tubular element 90f nearly to the outward end of the space between disks 68 and 70.

Thermal Conditioning

There are two requirements for using active air to thermally condition the high-pressure compressor (HPC) rotor components. First, the active air system must provide sufficient pressure ratio during all engine operating conditions to ensure that system flow reversal does not occur. If such reversal were to occur, there may be a sufficient loss in HPC stall margins to prevent compressor operation. Second, the active air system must provide sufficient heat transfer from the active air to the HPC disks to limit disk time constants to the same range as those of the HPC stator cases. When rotor disk time constants are sufficiently larger (2–3 times) than stator case time constants, large airfoil tip rubs can occur during some transient engine operating conditions. One such particularly limiting condition is a rapid deceleration from stabilized maximum power to idle, then a reburst to maximum power before the rotor can cool to idle temperature levels.

FIG. 7 schematically illustrates how the active air system provides sufficient pressure ratio during all engine operating conditions. Referring also to FIG. 8, bleed air is extracted from the discharge stream at the third stage stator. There are numerous ways known in the art to do that. This is a "slippery" bleed in that the ports through which the bleed air exits from the stator are oriented so as to minimize the pressure drop from HPC main gas stream into the bleed ports. Essentially, the bleed ports 170 are circumferentially curved and aimed in the direction of HPC mainstream flow to the extent possible. Numerous ports 170 are located circumferentially around the stator and direct bleed air into a manifold. Bleed air will flow either into the heat exchanger or through the heat exchanger bypass depending on the discharge temperature ($T_3$) of HPC. The heat exchanger is preferably a phase change type which uses the heat from the bleed air to change the phase of the majority of an available liquid to a gas.

When $T_3$ is more than 200° F. below maximum, such as at low-power conditions, valve V1 is closed and valve V2 is open so bleed air bypasses the heat exchanger and its associated pressure drop. This reduces the active air system pressure differential at low-power conditions. At idle condition, the calculated total pressure at the bleed manifold entrance 170 is 68 psi. With the heat exchanger bypassed, this is sufficient pressure to ensure no reversals occur in the active air system.

When $T_3$ is within 200° F. of maximum, such as at higher power conditions, valve V1 is open and valve V2 is closed so that bleed air flows through the heat exchanger. The design point pressure available for bleed air is 260 psi, and the corresponding pressure calculated for the fourth stage blade inner cavity is 205 psi. These pressures are sufficient for the active air system to withstand the pressure drop through the heat exchanger and still achieve the desired disk time constant goals and the fourth stage blade cooling goal. The functions of V1 and V2 may be performed by a single device or by two or more devices using devices and switching methods known in the art.

Referring also to FIG. 8, pressure drop in the active air system is also minimized by the use of tangential on-board injection (TOBI) at the front frame in a manner known in the art. As with the "slippery" bleed ports for the bleed air, numerous nozzles for the TOBI are circumferentially disposed in the space directly forward of the forward stub shaft 98 and directed in the direction of HPC rotor rotation so that air exiting the TOBI nozzles 172 has a velocity component in the direction of HPC rotation. This, along with locating the nozzles at the maximum possible radius as shown in FIG. 8, minimizes the active air temperature rise from the front frame to the HPC through apertures 102.

Once inside the HPC, the active air is maintained in a forced vortex flow regime during almost all axial and radially inward flow circuits. Forced vortex flows have lower pressure drops than free vortex flows when the flows are radially inward. The forced vortex flow system areas are provided by using the hollow tie rods 92 as the axial flow distributors, and by providing baffle plate 154 and radial vanes 156 between disks 68 and 70 to pump the active air.

Sufficient heat transfer from the active air to the HPC disks is aided by maintaining active air relative velocities which enhance heat transfer coefficients. The amount of cooling air introduced through apertures 102 in stub shaft 98 at the design point condition is 0.7% $W_c$. (The design point condition is defined as 100% corrected speed, and $W_c$ is defined as the total compressor air flow.) Apertures 102 each preferably have a diameter of approximately 0.4 inches. Air flows rearward along the annulus between the LP shaft 104 and the rotor and spacer disks. Spacer disk 74 has inner rim portion 174 with seal portion 176 at its end which partially seals against LP shaft 104 to create partial back pressure in the airflow along shaft 104, which facilitates air flow between spacer disk 72 and rotor disk 64 and into aperture 106 in tie rod 92. The spacing of seal portion 176 relative to shaft 104 controls the amount of air flowing past seal 176 and the relative pressures upstream and downstream from seal 176 to give the required active air circuit flows. For example, on a 7.5 inch diameter LP shaft 104, seal 176 leaves an effective clearance of approximately 0.02 inches between it and LP shaft 104 at the design point condition to create an area of approximately 0.47 square inches around the shaft for airflow. Approximately 0.35% $W_c$ of the air flows under seal 176 and approximately 0.35% $W_c$ flows radially outward in front of rotor disk 64 and into aperture 106.

In the embodiment shown, aperture 106 has an area of 0.03 square inches, which could be obtained with a round hole having a 0.2 inch diameter. The internal bore of hollow tie rod 92 in this embodiment is 0.4 inches in diameter. To minimize the strength loss in tie rod 92 due to aperture 106, aperture 106 is preferably a longitudinal slot having a smaller width than the 0.2 inch diameter hole. The slotted configuration further enhances the air flow into tie rod 92 by making the air flow turn more gradually through the aperture, thereby reducing the pressure drop at the aperture entrance.

Similarly, rotor 68 has inner rim portion 178 with seal portion 180 which creates a partial back pressure that facilitates flow between spacer disk 74 and rotor disk 66 into aperture 108 in tie rod 92. The clearance between seal portion 180 and LP shaft 104 is the same as on seal portion 176. Approximately 0.3% $W_c$ flows in front of rotor disk 66 and into aperture 108 which is 0.18 inches diameter, or slotted. Approximately 0.05% $W_c$ flows under rotor disk 66.

The apertures 110 and 112 in tie rod 92 provide exits for air, thereby establishing air flow through hollow tie rod 92 as indicated by the arrows. Approximately 0.25% $W_c$ exits aperture 110 which is 0.16 inches diameter, and approximately 0.40% $W_c$ exits aperture 112, which is 0.21 inches diameter, to thermally condition rotor disks 68 and 70 and blades 68a and 70a. Apertures 110 in 112 are preferably positioned on a radially outward portion of tie rod 92, and apertures 106 and 108 are preferably positioned on a radially inward portion of tie rod 92. In those positions, the apertures can also take advantage of centrifugal force to help move air through them. Movement of air into apertures 106 and 108 forward of rotor disks 64 and 66 respectively further facilitates air flow outward along the front of rotor disks 64 and 66. Air flowing out of aperture 110 aft of rotor disk 66 is directed outward along the rear side of rotor disk 66, then it flows along spacer drum 76 and the inner forward side of rotor disk 68, into the airflow along LP shaft 104 and under seal portion 166. Air exiting aperture 112 in tubular element 90f flows radially outward between rotor disk 68 and baffle 154, and enters an internal cavity in blade 68a through aperture 152.

Air is circulated throughout blades 68a and 70a in a manner known in the art, then air exits aperture 152 on the aft side of baffle 154 where it is directed radially inward by radial vanes 156 on baffle 154. Active air moving between rotor disks 68 and 70 thermally conditions them sufficiently to reduce their transient thermal response times and to maintain their maximum temperature below the limit allowed. The dual disk arrangement for the fourth stage rotor allows the total mass for the fourth stage rotor bore portion to be lower than that of a single disk rotor. The lower mass facilitates faster thermal conditioning as well.

This highly optimized disk thermal conditioning reduces disk mass average temperatures and reduces disk time constants during engine transients. This controls airfoil tip radial excursions during engine transients, which allows airfoil tip clearance reductions that positively impact both HPC efficiency and operability.

Air exits the inner space between rotor disks 68 and 70 and joins the flow along LP shaft 104 which then exits the HPC. From there, the active air is transmitted under the high-pressure turbine (HPT) disk to provide HPT disk thermal conditioning and reduce the HPT disk time constants. After passing under the HPT disk, the active air is discharged back into the main flow path behind the low-pressure turbine (LPT) which is the lowest pressure source in the engine turbomachinery area.

Alternative Embodiments

Figure 11:
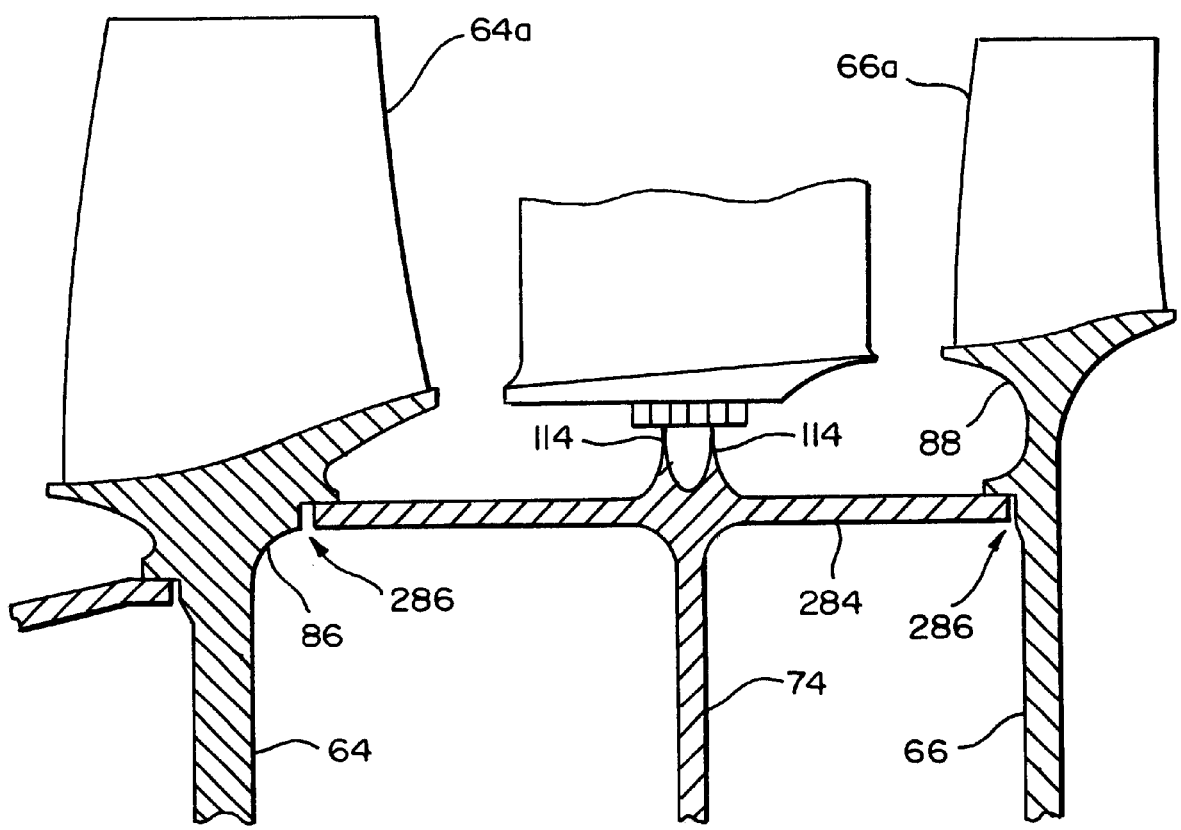
FIG. 11 is a cross-sectional view of a portion of an alternate embodiment showing an alternative configuration for a spacer disk.

Referring to FIG. 11, although the maximum benefit of the present invention can be best realized using the combination of hollow tie rods and spacer disks with a catenary shaped outer portion, significant benefit can still be obtained using the hollow tie rods and spacer disks which have conventional cylindrical or conical shaped outer portions. For example, outer portion 284 of spacer disk 74 spans from rim 86 of rotor disk 64 to rim 88 of rotor disk 66, but the shape of outer portion 284 does not have a catenary configuration. As with the preferred embodiment, seal teeth 114 are substantially aligned with the web of spacer disk 74 to minimize radial strain on teeth 114.

In this configuration, outer portion 284 has a length which allows a small gap 286 between the ends of outer portion 284 and rims 86 and 88 so that no axial preload from tensioning the tie rods is transmitted through outer portion 284. All the axial preload should go through the tie rods.

Figure 12:
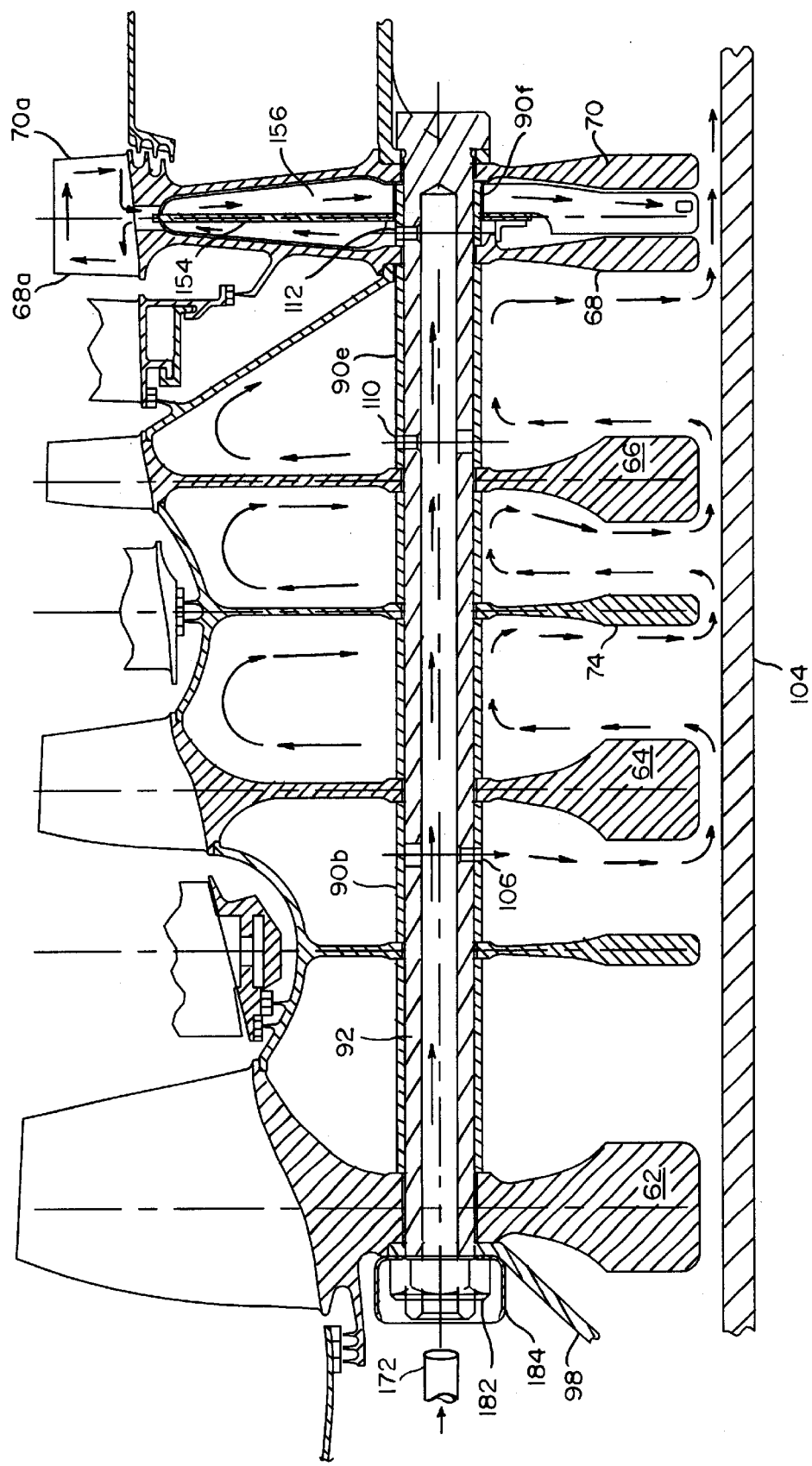
FIG. 12 is a view similar to FIG. 8 showing an alternate embodiment for distributing active air among compressor spool components.

Referring to FIG. 12, an alternative to injecting air from the TOBI nozzles through the forward stub shaft 98 is to inject it directly into the forward end of hollow tie rods 92, thereby eliminating the need for apertures in the forward stub shaft. This embodiment is considered by the inventor to be the best mode of the invention. The forward end of tie rods 92 having an external nut 182 rather than an internal bolt. This allows the forward end of the hollow tie rods to be open. TOBI nozzles 172 are directed directly at the open forward end of tie rods 92. A windage cover 184 is preferably attached behind nuts 182 and covers nuts 182 and the forward ends of tie rods 92 so that the air exiting TOBI nozzles 172 sees a smooth surface and is not churned by the ends of the tie rods and nuts 182. The windage cover 184 has apertures corresponding with the tie rods which allow air flow into tie rods 92 and also wrench access to nuts 182.

Tie rod 92 and spacer sections 90b, 90e, and 90f have three apertures 106, 110, and 112 respectively. Aperture 106 preferably has a diameter of approximately 0.1 inch, aperture 110 preferably has a diameter of approximately 0.15 inches, and aperture 112 preferably has an effective area approximately equal to that of a 0.25 inch diameter aperture.

Approximately 0.7% $W_c$ air flows from TOBI nozzles 172 into tie rods 92. Approximately 0.1% $W_c$ air exits aperture 106 and flows rearward between rotor 64 and LP shaft 104, throughout the cavity between rotor 64 and spacer 74, around spacer 74, throughout the cavity between spacer 74 and rotor 66, then through seal 176, around rotor 66 and throughout the cavity between rotor 66 and rotor 68 where it is joined by 0.2% $W_c$ air exiting aperture 110. The total 0.3% $W_c$ air circulating in the cavity between rotor 66 and rotor 68 flows through seal 180, and under rotors 68 and 70 where it exits the HPC. Approximately 0.4% $W_c$ air exits aperture 112 and is circulated between rotors 68 and 70 and throughout blades 68a and 70a as previously described. Air exits the inner space between rotor disks 68 and 70 and joins the flow along LP shaft 104 which then exits the HPC.

The improvements described above to the HPC of a gas turbine aircraft engine improve the efficiency of the compressor and allow the maximum surface speed of the compressor rotor to be increased, thereby increasing the compressor discharge pressure and, consequently, the maximum temperature of the discharge air. Thermal conditioning is provided for the rotor components to keep the maximum operating temperature of those components within current limits and to reduce their transient thermal response rates.

The descriptions above and the accompanying drawings should be interpreted in the illustrative and not the limited sense. While the invention has been disclosed in connection with the preferred embodiment illustrating a four-stage compressor, it should be understood that there may be other embodiments, including compressors with more or less than four stages, which fall within the scope of the invention as defined by the following claims.

What is claimed is:

1. In a gas turbine including a compressor for producing a main air stream, the compressor having a stator and a spool comprised of multiple axial stages extending between a first stage at a forward end of the compressor and a last stage at an aft end of the compressor, each stage including a rotor disk having a peripheral rim and multiple blades attached to the rim, the first stage rotor disk having a front stub shaft extending in a forward direction, the last stage rotor disk having a rear stub shaft extending in an aft direction, the improvement comprising:
   (a) a spacer disk disposed between adjacent rotor disks, the spacer disk having an outer portion and a web portion, the outer portion extending generally axially between the peripheral rims of the adjacent rotor disks, the outer portion having a forward end, an aft end and a center region between the forward end and the aft end, the web portion extending radially inward from the center region; and
   (b) a plurality of tie rods, each tie rod having a hollow interior for conducting air, the tie rods extending through the rotor disks and the spacer disks, the tie rods being tensionable to provide axial preload between the disks.

2. The improvement of claim 1, wherein the outer portion of the spacer disk has a catenary shape in cross section.

3. The improvement of claim 1, further comprising a plurality of tubular elements on each tie rod, each tubular element being disposed between adjacent spacer and rotor disks, the tie rod being disposed inside of the tubular elements, the tubular elements establishing axial spacing between disks and providing compressive reactions to tie rod tension forces.

4. The improvement of claim 3, wherein each tie rod has a wall with at least one aperture through the wall for transmitting active air, and at least one of the tubular elements has at least one aperture for transmitting active air which aligns with the at least one aperture for transmitting active air in the tie rod.

5. The improvement of claim 4, further comprising at least one alignment feature operating between the tubular elements which have at least one aperture and the tie rod disposed inside of the tubular elements, the at least one alignment feature maintaining alignment between apertures in the tubular elements and apertures in the tie rod.

6. The improvement of claim 5, wherein the at least one alignment feature includes an aperture in the wall of the tie rod, a threaded aperture through the tubular element, and a threaded pin having a threaded portion which engages the threaded aperture in the tubular element and a pin portion which engages the aperture in the tie rod when threaded portion engages the threaded aperture in the tubular element.

7. The improvement of claim 3, wherein each spacer disk and rotor disk has a plurality of apertures through which the tie rods pass, and a circular embossment around each aperture, and wherein each end of the tubular elements has a flange that engages one of the circular embossments, the flange having a recess which receives the circular embossment and provides axial contact between the flange and the circular embossment.

8. The improvement of claim 1, wherein the peripheral rim of each rotor disk has a lip which receives one of the ends of the outer portion of an adjacent spacer disk.

9. The improvement of claim 1, wherein the outer portion has at least one seal tooth extending generally radially outward to seal against a portion of the stator.

10. The improvement of claim 9, wherein the at least one seal tooth is generally radially aligned with the web portion to minimize radial deflection of the seal tooth.

11. The improvement of claim 1, further comprising a compressor discharge pressure seal extending from a portion of the stator axially to the last stage rotor disk, the seal having teeth oriented generally axially.

12. The improvement of claim 11, wherein the teeth of the seal form a fishmouth configuration.

13. The improvement of claim 1, wherein the last stage includes a pair of mating forward and aft rotor disks with a cavity formed therebetween.

14. The improvement of claim 13, wherein the blades on the last stage include mating forward and aft portions, the forward portion being integral with the forward rotor disk and the aft portion being integral with the aft rotor disk, and wherein the blades defined an internal cavity in fluid communication with the cavity between the forward and aft rotor disks.

15. The improvement of claim 13, further comprising a spacer disposed between the forward rotor disk of the last stage and an adjacent rotor disk of a previous stage, the spacer connecting to the forward rotor disk of the last stage at a radial location of the tie rods and extending forward to the peripheral rim of the adjacent rotor disk.

16. The improvement of claim 13, further comprising a baffle plate in the cavity between the forward and aft rotor disks, the baffle plate generally bisecting the cavity into a forward portion and an aft portion.

17. The improvement of claim 16, wherein the baffle plate has an aft side with radial vanes on the aft side for pumping air in the aft portion of the cavity.

18. The improvement of claim 17 wherein each tie rod has a wall with at least one aperture through the wall, the aperture located axially on the tie rod so as to provide fluid communication between the forward portion of the cavity between the last stage rotor disks and the interior of the tie rod.

19. The improvement of claim 1, wherein each tie rod has a wall with at least one aperture through the wall for transmitting active air.

20. The improvement of claim 19, wherein the at least one aperture for transmitting active air faces radially inward.

21. The improvement of claim 19, wherein the at least one aperture for transmitting active air faces radially outward.

22. The improvement of claim 19, further comprising a system for extracting a portion of the main air stream from the stator at a stage before the last stage, mechanisms for selectively routing at least part of the extracted portion of air through a heat exchanger or a bypass of the heat exchanger, and a system for injecting at least part of the extracted portion of air from the heat exchanger or from the bypass into the spool at a location in front of the first stage as active air for use in thermal conditioning spool components.

23. The improvement of claim 22, wherein the system for extracting includes a plurality of bleed ports, each bleed port being circumferentially curved and aimed in the main air stream direction so as to minimize pressure drop from the main air stream into the bleed ports.

24. The improvement of claim 23, wherein the mechanisms for selectively routing includes at least one valve.

25. The improvement of claim 24, wherein the at least one valve directs air to the heat exchanger when a temperature of the main air stream discharged from the compressor is within 200 degrees of a maximum limit.

26. The improvement of claim 24, wherein the at least one valve directs air to the bypass when a temperature of the main air stream discharged from the compressor is not within 200 degrees of a maximum limit.

27. The improvement of claim 22, wherein the front stub shaft has a plurality of apertures oriented generally circumferentially at a uniform radius, and the system for injecting includes a plurality of nozzles disposed in front of the front stub shaft and oriented so as to discharge air through the apertures in the stub shaft.

28. The improvement of claim 27, wherein the nozzles are oriented so that air exits them having a velocity component in direction of spool rotation.

29. The improvement of claim 22, wherein the hollow tie rods have an open forward end, and the system for injecting includes a plurality of nozzles disposed in front of the first stage rotor and oriented so as to discharge air into the open forward end of the tie rods.

30. The improvement of claim 29, wherein the nozzles are oriented so that air exits them having a velocity component in a direction of spool rotation.

31. The improvement of claim 22, further comprising at least one partial seal between a rotor disk or spacer disk and a central shaft which allows a portion of the active air to flow between the seal and the shaft and creates back pressure which directs another portion of the active air to flow outward along a disk forward of the seal.

32. In a gas turbine including a compressor for producing a main air stream, the compressor having a stator and a spool comprised of multiple stages extending between a first stage at a forward end of the compressor and a last stage at an aft end of the compressor, each stage including a rotor disk having a peripheral rim and multiple blades attached to the rim, the first stage rotor disk having a front stub shaft extending forward of the rotor disk, the last stage rotor disk having a rear stub shaft extending in an aft direction, the improvement comprising:

(a) a spacer disk disposed between adjacent rotor disks, the spacer disk having an outer portion and a web portion, the outer portion having a catenary shape in cross-section and extending generally axially between the peripheral rims of the adjacent rotor disks, the outer portion having a forward end, an aft end and a center region between the forward end and the aft end, the peripheral rim of each rotor disk having a lip which receives one of the ends of the outer portion, the web portion extending radially inward from the center region of the outer portion, the outer portion having at least one seal tooth extending generally radially outward from the center region to seal against a portion of the stator;

(b) the last stage including a pair of mating forward and aft rotor disks with a cavity formed between the disks, the blades on the last stage include mating forward and aft portions, the forward portion being integral with the forward rotor disk and the aft portion being integral with the aft rotor disk, the blades having an internal cavity in fluid communication with the cavity between the forward and aft rotor disks;

(c) a baffle plate in the cavity between the forward and aft rotor disks, the baffle plate generally bisecting the cavity into a forward portion and an aft portion, the baffle plate having an aft side with radial vanes on the aft side, (d) a plurality of tie rods, each tie rod having a hollow interior for conducting air and a plurality of apertures, at least one of the apertures providing fluid communication between the interior of the tie rod and the cavity between the forward and aft last stage rotor disks, at least one other aperture providing fluid communication between the interior of the tie rod and a space between a rotor disk and a spacer disk, the tie rods extending through the rotor disks and the spacer disks, the tie rods being tensionable to provide axial preload between the disks;

(e) a plurality of tubular elements on each tie rod to establish axial spacing between the disks and to react tie rod axial preload forces, each tubular element being disposed between adjacent spacer and rotor disks, the tie rod being disposed inside of the tubular elements, at least one of the tubular elements having at least one aperture which aligns with at least one aperture in the tie rod; and (f) a compressor discharge pressure seal extending axially forward from a portion of the stator to the last stage aft rotor disk, the seal having teeth oriented generally axially.

33. In a gas turbine including a compressor for producing a main air stream, the compressor having a stator and a spool comprised of multiple stages extending between a first stage at a forward end of the compressor and a last stage at an aft end of the compressor, each stage including a rotor disk having a peripheral rim and multiple blades attached to the rim, the first stage rotor disk having a front stub shaft extending forward of the rotor disk, the last stage rotor disk having a rear stub shaft extending in an aft direction, the improvement comprising:

(a) a spacer disk disposed between adjacent rotor disks, the spacer disk having an outer portion and a web portion, the outer portion having a catenary shape in cross-section and extending generally axially between the peripheral rims of the adjacent rotor disks, the outer portion having a forward end, an aft end and a center region between the forward end and the aft end, the web portion extending radially inward from the center region;

(b) the last stage including a pair of mating forward and aft rotor disks with a cavity formed therebetween, (c) a plurality of tie rods, each tie rod having a hollow interior for conducting air and a plurality of apertures, at least one of the apertures providing fluid communication between the interior of the tie rod and the cavity between the forward and aft last stage rotor disks, at least one other aperture providing fluid communication between the interior of the tie rod and a space between a rotor disk and a spacer disk, the tie rods extending through the rotor disks and the spacer disks, the tie rods being tensionable to provide axial preload between the disks;

(d) a compressor discharge pressure seal extending axially forward from a portion of the stator to the last stage aft rotor disk, the seal having teeth oriented generally axially;

(e) system for extracting a portion of the main air stream from a stage before the last stage;

(f) mechanism for selectively routing at least part of the extracted portion of air through a heat exchanger or a bypass of the heat exchanger;

(g) system for injecting at least part of the extracted portion of air from the heat exchanger or from the bypass into the spool at a location in front of the first stage as active air for use in thermal conditioning spool components;

(h) mechanism for passing a portion of active air injected in front of the first stage into the tie rods, through the interior of the tie rods, and out through at least one aperture in the tie rods, one of the apertures through which air flows out directing air into the cavity between the last stage rotor disks; and (i) mechanism for passing the air in the cavity between the last stage rotor disks outward along the last stage forward rotor disk, into the last stage blades, and back inward with forced vortex flow along the last stage aft disk.

34. A method of thermally conditioning the spool components of a gas turbine main air stream compressor comprising the steps of:

extracting a portion of the main air stream, routing at least part of the extracted portion of air through a heat exchanger, injecting at least part of the extracted portion of air from the heat exchanger into the spool as active air, and passing at least a portion of the active air through hollow tie rods to thermally condition the spool components.

35. The method of claim 34, further comprising the steps of:

monitoring the temperature of the main air stream, and routing the extracted part of air to bypass the heat exchanger when the temperature falls more than 200° F. below a preselected maximum.

36. The method of claim 34, wherein the spool has a plurality of radially oriented disks and a plurality of hollow tie rods extending axially through the disks, the spool has a last stage with a pair of mating forward and aft rotor disks having a cavity formed therebetween, and further comprising the step of directing air from the tie rods into the cavity between the last stage rotor disks.

37. The method of claim 36 wherein the last stage rotor disks have hollow blades at their periphery, and further comprising the step of passing the air in the cavity between the last stage rotor disks outward along the last stage forward rotor disk, into the last stage blades, and back inward along the last stage aft rotor disk.

38. The method of claim 34, wherein the hollow tie rods have open forward ends, and further including the step of directing active air into the open forward ends of the tie rods.

39. The method of claim 34, wherein the spool has a first stage with a forward stub shaft having apertures therein, each of the hollow tie rods have a wall with at least two apertures through it, and further including the step of directing the active air first through the apertures in the forward stub shaft then into at least one of the apertures through the wall of the tie rods.

40. A spacer disk for spanning distance between peripheral rims of adjacent rotor disks of a gas turbine compressor spool, comprising:

a radially extending disk body, and a generally axially extending outer portion spanning the distance between the peripheral rims of adjacent rotor disks, the outer portion having a catenary shape cross-section for limiting the axial preload compressive loads applied to the spacer during spool assembly and for minimizing radial deflection of the outer portion during rotation of the spool.

41. In a gas turbine including a compressor for producing a main air stream, the compressor having a stator and a spool comprised of multiple axial stages extending between a first stage at a forward end of the compressor and a last stage at an aft end of the compressor, each stage including a rotor disk having a peripheral rim and multiple blades attached to the rim, the improvement comprising:

a stator sealing rim on the stator, the stator sealing rim having radially spaced stator sealing teeth extending generally axially; and radially spaced rotor sealing teeth extending generally axially from the peripheral rim of the last stage rotor disk associated with the stator sealing rim, the stator sealing teeth and the rotor sealing teeth cooperating to form a fishmouth configuration.

* * * * *